United States Patent
Ando

(10) Patent No.: US 9,345,991 B2
(45) Date of Patent: May 24, 2016

(54) DEFOAMING AGENT

(75) Inventor: Tsuyoshi Ando, Kyoto (JP)

(73) Assignee: SAN NOPCO LTD., Kyoto-shi (JP)

(*) Notice: Subject to any disclaimer, the term of this patent is extended or adjusted under 35 U.S.C. 154(b) by 232 days.

(21) Appl. No.: 14/113,464

(22) PCT Filed: Jun. 3, 2011

(86) PCT No.: PCT/JP2011/062796
§ 371 (c)(1),
(2), (4) Date: Dec. 4, 2013

(87) PCT Pub. No.: WO2012/164741
PCT Pub. Date: Dec. 6, 2012

(65) Prior Publication Data
US 2014/0100293 A1 Apr. 10, 2014

(51) Int. Cl.
*B01D 19/04* (2006.01)

(52) U.S. Cl.
CPC ........ *B01D 19/0409* (2013.01); *B01D 19/0404* (2013.01); *B01D 19/0413* (2013.01)

(58) Field of Classification Search
CPC ........... B01D 19/0404; B01D 19/0409; B01D 19/0413
See application file for complete search history.

(56) References Cited

U.S. PATENT DOCUMENTS

2011/0207650 A1* 8/2011 Rautschek ......... B01D 19/0404 510/405
2011/0281985 A1* 11/2011 Matsumura ........ B01D 19/0404 524/230

FOREIGN PATENT DOCUMENTS

| CA | 2112491 A1 | 1/1993 |
|---|---|---|
| JP | 50-013282 A | 2/1975 |
| JP | 50-13282 A | 2/1975 |
| JP | 6-508548 A | 9/1994 |
| JP | 06-508548 A | 9/1994 |
| JP | 10-286404 A | 10/1998 |
| JP | 2007-222812 A | 9/2007 |
| JP | 2008-188480 A | 8/2008 |
| JP | 2011-506086 A | 3/2011 |
| WO | 19931000144 A1 | 1/1993 |
| WO | WO2009/047066 A1 * | 4/2009 |
| WO | 2009/080428 A1 | 7/2009 |
| WO | WO2010/087196 A1 * | 8/2010 |

OTHER PUBLICATIONS

International Search Report dated Aug. 23, 2011, issued in corresponding application No. PCT/JP2011/062796.
Chinese Office Action dated Sep. 3, 2014, issued in counterpart Chinese Patent Application No. 201180071397.8, w/English translation (17 pages).
Office Action dated Feb. 3, 2015, issued in corresponding Japanese Patent Application No. 2013-517792, with English translation (13 pages).
Notification of Transmittal of Copies of Translation of the International Preliminary Report on Patentabililty (Form PCT/IB/338) of International Application No. PCT/JP2011/062796 mailed Dec. 19, 2013 with Forms PCT/IB1373 and PCT/ISA/237.
Decision of Rejection dated Sep. 8, 2015, issued in counterpart Japanese Patent Application No. 2013-517792, w/English translation (7 pages).

* cited by examiner

*Primary Examiner* — Robert Jones, Jr.
(74) *Attorney, Agent, or Firm* — Westerman, Hattori, Daniels & Adrian, LLP

(57) ABSTRACT

The present invention provides a defoaming agent containing, as essential components, hydrophobic dry silica (S) prepared by hydrophobizing silica prepared using a dry process and having a primary particle diameter of 5 to 100 nm, water, and a hydrophobic liquid (Q) containing 1 to 25% by weight of an ester compound (E) represented by the following formula, $(R^1—COO)_p-D$, wherein $R^1$ denotes an alkyl group or an alkenyl group; D denotes a residue resulting from the removal of a hydroxyl group contributing to an ester linkage from a compound (D') containing 2 to 6 carbon atoms and 1 to 6 hydroxyl groups or a residue resulting from the removal of a hydroxyl group contributing to an ester linkage from an adduct prepared by adding an alkylene oxide to the compound (D'); and p denotes an integer from 1 to 3.

9 Claims, No Drawings

DEFOAMING AGENT

TECHNICAL FIELD

The present invention relates to a defoaming agent. More specifically, the present invention relates to defoaming agents suitable for fields such as paint industry (water-based paints, paper coating paints), chemical industry, food stuff industry, petroleum industry, civil engineering and construction industry, textile industry, paper and pulp industry, pharmaceutical industry, and drainage treatment processes.

BACKGROUND ART

Emulsion type defoaming agents using alkylene oxide derivatives as emulsifiers have heretofore been known (Patent Documents 1 and 2).

PRIOR ART DOCUMENTS

Patent Documents

Patent Document 1: JP-A-2008-188480
Patent Document 2: JP-T-2011-506086 (WO2009/080428 pamphlet)

SUMMARY OF THE INVENTION

Problems to be Solved by the Invention

However, the emulsion type defoaming agent described in Patent Document 1 has a problem that the product stability is insufficient and also has a problem that the emulsifier serves as a foaming component and sufficient foaming property is not obtained within a wide temperature range (5 to 70° C.), especially, in a high temperature region.

On the other hand, the defoaming agent described in Patent Document 2 also has the same problems because an emulsification needs an emulsifier as in the emulsion type defoaming agent of Patent Document 1.

That is, an object of the present invention is to provide a defoaming agent that is superior in defoaming property within a wide temperature range and also superior in product stability.

Solutions to the Problems

The present inventor has reached the present invention as a result of earnest studies performed for attaining the above-mentioned object. That is, the defoaming agent of the present invention is characterized by containing, as essential components, hydrophobic dry silica (S) prepared by hydrophobizing silica prepared using a dry process and having a primary particle diameter of 5 to 100 nm, water, and a hydrophobic liquid (Q) containing 1 to 25% by weight of an ester compound (E) represented by general formula (1):

$$(R^1—COO)_p\text{-}D \quad (1)$$

wherein $R^1$ denotes an alkyl group having 1 to 21 carbon atoms or an alkenyl group having 2 to 21 carbon atoms; D denotes a residue resulting from the removal of a hydroxyl group contributing to an ester linkage from a compound (D') containing 2 to 6 carbon atoms and 1 to 6 hydroxyl groups or a residue resulting from the removal of a hydroxyl group contributing to an ester linkage from an adduct prepared by adding an alkylene oxide having 2 to 4 carbon atoms to the compound (D'); and p denotes an integer from 1 to 3.

The production method of the present invention is characterized in that it is a method for producing the above-mentioned defoaming agent, the method having a step of adding the hydrophobic dry silica (S) to a mixed liquid of the hydrophobic liquid (Q) and the water and then mixing them.

Advantages of the Invention

The defoaming agent of the present invention generates neither aggregation nor scum of the defoaming agent even if it is charged into a foaming liquid at widely ranging temperatures because the defoaming agent exhibits a superior defoaming property within a wide temperature range (5 to 70° C.) and is also superior in product stability.

The use of the production method of the present invention makes it possible to produce the above-mentioned defoaming agent easily.

MODE FOR CARRYING OUT THE INVENTION

Any silica prepared by hydrophobizing silica prepared using a dry process and having a primary particle diameter of 5 to 100 nm can be used as the hydrophobic dry silica (S) without any limitations.

Examples of the silica prepared using a dry process and having a primary particle diameter of 5 to 100 nm include silica prepared using a dry process in amorphous synthetic silica (SN). That is, examples of the amorphous synthetic silica (SN) include dry (pyrogenic, fused) silica (SD) and wet (gel-processed, precipitated) silica (SW). Of these, silica with a primary particle diameter of 5 to 100 nm prepared using a dry process may be used as dry silica.

Examples of amorphous synthetic silica (SN) include ones provided below. Of these, the wet (gel-processed, precipitated) silica (SW) is used for hydrophobic wet silica (B3), which is described later.

(1) Pyrogenic silica: this is prepared by burning a silicon compound such as silicon tetrachloride in an oxyhydrogen flame and is prone to exist as primary particles (particulates).

(2) Fused silica: this is prepared by fusing a natural silica powder or the like in a flame and is prone to exist as primary particles (particulates).

(3) Gel-processed silica: this is prepared by neutralizing sodium silicate with an acid under an acidic environment, collecting the resulting precipitate by filtration, and then drying the precipitate, and has an aggregated structure.

(4) Precipitated silica: this is prepared by neutralizing sodium silicate with an acid under an alkaline environment, collecting the resulting precipitate by filtration, and then drying the precipitate, and has a large pore volume and is large in specific surface area.

Since such types of amorphous synthetic silica (SN) have hydroxysilyl groups (silanol groups) on their silica particle surfaces, they exhibit hydrophilicity. Of these, pyrogenic silica is preferred in terms of the defoaming property, product stability, and the like.

Amorphous synthetic silica (SN) can be obtained from the market easily and trade names thereof are provided below.
<Pyrogenic Silica>

Aerosil series {available from Nippon Aerosil Co., Ltd. and Evonik Degussa GMBH; "Aerosil" is a registered trademark of Evonik Degussa GMBH}, Reolosil series {available from Tokuyama Corporation; "Reorosil" is a registered trademark of Tokuyama Corporation}, Cab-O-Sil series {available from Cabot Corporation; "Cab-O-Sil" is a registered trademark of Cabot Corporation}, and the like.

<Fused Silica>

Admafine series {available from Admatechs Co., Ltd.; "Admafine" is a registered trademark of Toyota Motor Corporation} Fuselex series {available from Tatsumori Ltd.}, DENKA fused silica series {available from Denki Kagaku Kogyo Kabushiki Kaisha}, and the like.

<Precipitated Silica>

Nipsil series {available from Tosoh Silica Corporation; "Nipsil" is a registered trademark of Tosoh Silica Corporation}, Sipernat series {available from Evonik Degussa Japan Co., Ltd.; "Sipernat" is a registered trademark of Evonik Degussa GMBH.}, Carplex series {available from DSL. Japan Co., Ltd.; "Carplex" is a registered trademark of DSL. Japan Co., Ltd.}, FINESIL series {available from Tokuyama Corporation; "FINESIL" is a registered trademark of Tokuyama Corporation}, TOKUSIL {available from Tokuyama Corporation; "TOKUSIL" is a registered trademark of Tokuyama Corporation}, Zeosil {available from Rhodia; "Zeosil" is a registered trademark of Rhodia Chimie.}, MIZUKASIL series {available from Mizusawa Industrial Chemicals, Ltd.; "MIZUKASIL" is a registered trademark of Mizusawa Industrial Chemicals, Ltd.}, and the like.

<Gel-Processed Silica>

Carplex series, SYLYSIA series {available from Fuji Silysia Chemical Ltd.; "SYLYSIA" is a registered trademark of YUGENKAISHA Y.K.F.}, Nipgel series {available from Tosoh Silica Corporation; "Nipgel" is a registered trademark of Tosoh Silica Corporation}, MIZUKASIL series {available from Mizusawa Industrial Chemicals, Ltd.; "MIZUKASIL" is a registered trademark of Mizusawa Industrial Chemicals, Ltd.}, and the like.

For the hydrophobization of silica with a primary particle diameter of 5 to 100 nm prepared using a dry process {e.g., amorphous synthetic silica (SN)} may be applied a publicly known method, and the like, and examples thereof include a dry processing method that involves making an oleophilic compound {compounds mentioned later, e.g., halosilanes and alkoxysilanes} react to a silica particle surface to hydrophobize the surface while stirring a mixture of amorphous synthetic silica (SN) and an oleophilic compound, and a wet processing method that involves making an oleophilic compound to be adsorbed by or react to a silica particle surface to hydrophobize the surface in a solvent {organic solvent, mineral oil, animal or vegetable oil, or the like}.

An example of an applicable dry processing method is (1) a condensation reaction of functional groups located on silica with a primary particle diameter of 5 to 100 nm prepared using a dry process {amorphous synthetic silica (SN) or the like} with functional groups which an oleophilic compound has, and examples of an applicable wet processing method include (2) physical adsorption to pores possessed by silica with a primary particle diameter of 5 to 100 nm prepared using a dry process {amorphous synthetic silica (SN) or the like} and (3) electric adsorption of surface charges of silica with a primary particle diameter of 5 to 100 nm prepared using a dry process {amorphous synthetic silica (SN) or the like} with ionic functional groups of an oleophilic compound.

Of these, the method of using the condensation reaction (1) is preferred from the viewpoint that it is easy to prevent aggregation and maintain the primary particle diameter as well as the viewpoints of the defoaming property, product stability, and the like.

Examples of the oleophilic compound include halosilanes and alkoxysilanes.

Examples of the halosilanes include alkylhalosilanes the alkyl groups of which have 1 to 12 carbon atoms and arylhalosilanes the aryl groups of which have 6 to 12 carbon atoms, and examples thereof include methyltrichlorosilane, dimethyldichlorosilane, trimethylchlorosilane, trimethylbromosilane, ethyltrichlorosilane, phenyltrichlorosilane, diphenyl dichlorosilane, and tert-butyl dimethylchlorosilicane.

Examples of the alkoxysilanes include alkoxysilanes the alkyl groups or aryl groups of which have 1 to 12 carbon atoms and the alkoxy groups of which have 1 to 2 carbon atoms, and examples thereof include methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, isobutyltrimethoxysilane, hexyltrimethoxysilane, octyltrimethoxysilane, decyltrimethoxysilane, dodecyl trimethoxysilane, tetraethoxysilane, methyltriethoxysilane, dimethyldiethoxysilane, phenyltriethoxysilane, diphenyldiethoxysilane, isobutyltriethoxysilane, decyltriethoxysilane, vinyltriethoxysilane, and γ-methacryloxypropyltrimethoxysilane.

There can be used as the oleophilic compound publicly known coupling agents (silane coupling agents other than those mentioned above, titanate coupling agents, zircoaluminate coupling agents, and the like) as well as the oleophilic compounds mentioned above.

Of these oleophilic compounds, alkylhalosilanes and alkoxysilanes are preferred and alkoxysilanes are more preferred in terms of the defoaming property, product stability, and the like.

The M value of the hydrophobic dry silica (S) is preferably 30 to 80, more preferably 30 to 75, particularly preferably 35 to 75, and most preferably 40 to 70.

The M value is a concept indicating the degree of hydrophobicity; a higher M value indicates greater hydrophilicity, and the M value is represented by the volume ratio of methanol in a minimal amount at the time of uniformly dispersing the hydrophobic dry silica (S) in a water/methanol mixed solution and can be determined by the following method.

<Method of Calculating M Value>

A sample {hydrophobic dry silica (S)} (0.2 g) is added to 50 mL of water contained in a beaker with a capacity of 250 mL and subsequently methanol is dropped from a buret until all the sample is suspended. During this operation, the solution in the beaker is stirred with a magnetic stirrer continuously and the time when all the sample has been suspended uniformly in the solution is determined as an endpoint. The percentage by volume of methanol in the liquid mixture contained in the beaker at the endpoint is the M value.

The hydrophobic dry silica (S) can be easily obtained from the market and exemplary trade names thereof include the following.

<Silica Prepared by Hydrophobizing Pyrogenic Silica>

Aerosil series (R972, RX200, RY200, R202, R805, R812, and the like) {available from Nippon Aerosil Co., Ltd. and Evonik Degussa GMBH}, Reolosil MT and DM series (MT-10, DM-10, DM-20, and the like) {available from Tokuyama Corporation}, (TS-530, TS-610, TS-720, and the like) {available from Cabot Carbon}, and the like.

Fine particles of metal (aluminum, titanium, or the like) having a primary particle diameter of 5 to 100 nm may be used instead of the hydrophobic dry silica (S).

The primary particle diameter (nm) of the hydrophobic dry silica (S) is 5 to 100, preferably 5 to 80, more preferably 10 to 60, and particularly preferably 10 to 40. In such ranges, the defoaming property and the product stability are further improved. Usually, no change in primary particle diameter is found between before and after the hydrophobization.

The primary particle diameter of the hydrophobic dry silica (S) is a number-average circle-equivalent diameter calculated by using image processing software {e.g., WinRoof available from Mitani Corporation} in accordance with JIS Z8827-1: 2008 (corresponding International Standard: ISO13322-1, the disclosure of which is herein incorporated by reference in entirety) "Particle size analysis-Image analysis methods-Part 1: Static image analysis methods" from an image obtained by observing with a transmission electron microscope at 50,000 to 1,000,000 magnifications a sample prepared by the dusting method in accordance with JIS Z8901-2006 "Test powders and test particles," 5.44 Particle size distribution, (c) Microscopy.

Any compound represented by general formula (1) may be used as the ester compound (E) without any limitations.

Of the alkyl group having 1 to 21 carbon atoms or the alkenyl group having 2 to 21 carbon atoms ($R^1$) in the general formula (1), a linear alkyl group, a branched alkyl group, or the like may be used as the alkyl group having 1 to 21 carbon atoms.

Examples of the linear alkyl group include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosyl.

Examples of the branched alkyl group include isopropyl, isobutyl, tert-butyl, isopentyl, neopentyl, isohexyl, 2-ethylhexyl, isotridecyl, isotetradecyl, isooctadecyl, 2-propylheptyl, 2-butyloctyl, 2-hexyldecyl, 2-octyldodecyl, 2-dodecylhexyl, 3,5,5-trimethylhexyl, and 3,7,11-trimethyl dodecyl.

Of the alkyl group having 1 to 21 carbon atoms or the alkenyl group having 2 to 21 carbon atoms ($R^1$), a linear alkenyl group, a branched alkenyl group, or the like may be used as the alkenyl group having 2 to 21 carbon atoms.

Examples of the linear alkenyl group include vinyl, allyl, propenyl, butenyl, pentenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, and icosenyl.

Examples of the branched alkenyl group include isobutenyl, isopentenyl, neopentenyl, isohexenyl, isotridecenyl, and isooctadecenyl.

Of these, in view of the defoaming property and the like, the alkyl groups (the linear alkyl groups and the linear alkenyl groups) are preferred, the linear alkyl groups are more preferred, the linear alkyl groups having 8 to 20 carbon atoms are particularly preferred, and dodecyl and octadecyl are most preferred.

Examples of the compound (D') containing 2 to 6 carbon atoms and 1 to 6 hydroxyl groups in the general formula (1) include monoalcohols having an alkyl group having 2 to 6 carbon atoms and dihydric to hexahydric alcohols having 2 to 6 carbon atoms.

Examples of the monoalcohols having an alkyl group having 2 to 6 carbon atoms include ethyl alcohol, n-propyl alcohol, n-butyl alcohol, n-pentyl alcohol, and n-hexyl alcohol. Of these, n-butyl alcohol and n-hexyl alcohol are preferred, and n-butyl alcohol is more preferred.

Examples of the dihydric to hexahydric alcohols having 2 to 6 carbon atoms include ethylene glycol, propylene glycol, diethylene glycol, dipropylene glycol, tetramethylene glycol, hexamethylene glycol, glycerol, trimethylolpropane, cyclohexylene glycol, pentaerythritol, sorbitan, and sorbitol. Of these, diethylene glycol, dipropylene glycol, and trimethylolpropane are preferred.

As the adduct prepared by adding an alkylene oxide having 2 to 4 carbon atoms to the compound (D') having 2 to 6 carbon atoms and 1 to 6 hydroxyl groups in the general formula (1), any compound prepared by adding an alkylene oxide of the above-mentioned compound (D') may be used without any limitations.

Examples of the alkylene oxide having 2 to 4 carbon atoms include ethylene oxide, propylene oxide, and butylene oxide. When a plurality of alkylene oxides are used in the chemical reaction of the above-mentioned compound (D') with the alkylene oxide, the order of reacting them (a block fashion, a random fashion, and a combination thereof) and the usage percentages are not particularly limited, but preferably, a block fashion or a combination of a block fashion and a random fashion is included. Such a chemical reaction may be carried out in any fashion, such as anionic polymerization, cationic polymerization, or coordinated anionic polymerization. These fashions of polymerization may be used singly or in combination depending upon the degree of polymerization or the like.

In the general formula (1), p corresponds to the number of the hydroxyl groups of the compound (D') or the number of the hydroxyl groups of the adduct prepared by adding an alkylene oxide to the compound (D') in the case of full esters of monohydric to trihydric alcohols, whereas p corresponds to a number smaller than the number of such hydroxyl groups (the number of hydroxyl groups having contributed to an ester linkage of all the hydroxyl groups) in the case of partial esters.

Examples of the ester compound (E) include ethylene glycol diformate, glycerol triacetate, trimethylolpropane tributyrate, tetramethylene glycol dicaprate, polyethylene glycol diacrylate, glycerol-polypropylene oxide adduct dilaurate, ethylene glycol distearate, propylene glycol dibehenate, glycerol tricrotonate, trimethylolpropane trioleate, tetramethylene glycol dilinoleate, ethylene glycol diarachidonate, glycerol trierucate, sorbitan monococoate, sorbitan monostearate, sorbitan monooleate, sorbitan trioleate, and sorbitan polyoxyethylene cocoate.

The HLB value of the ester compound (E) is preferably 2 to 7, more preferably 3 to 7, particularly preferably 4 to 7, and most preferably 4 to 6. In such ranges, the product stability and the defoaming property at high temperatures are further improved.

The HLB is a concept that indicates the balance between hydrophilic groups and hydrophobic groups in a molecule, and the value thereof can be calculated by the "Method for Measuring HLB by Emulsification Test" disclosed in "Properties and Applications of Surfactants", pp. 89-90, (authored by Karigome Takao, publisher: Saiwai Shobo, published Sep. 1, 1980). For example, the HLB can be calculated for ester compounds using the following test method.

<Method for Measuring HLB Value of Ester Compound by Emulsification Test>

An ester compound (X) whose HLB value is unknown and an emulsifier (A) whose HLB value is known are mixed in different ratios and an oil with known HLB value are emulsified. The HLB value of the ester compound (X) is calculated from the mixing ratio achieved when the thickness of the emulsified layer is maximum, by using the following equation.

$$\text{(The HLB value of the oil)} = \{(W_A \times \text{HLB}_A) + (W_X \times \text{HLB}_X)\}/(W_A + W_X)$$

$W_A$ is the weight fraction of the emulsifier (A) based on the total weight of the ester compound (X) and the emulsifier (A), $W_X$ is the weight fraction of the ester compound (X) based on the total weight of the ester compound (X) and the emulsifier (A), $\text{HLB}_A$ is the HLB value of the emulsifier (A), and $\text{HLB}_X$ is the HLB value of the ester compound (X).

The content (% by weight) of the ester compound (E) based on the weight of the hydrophobic liquid (Q) is preferably 1 to 25, more preferably 3 to 25, particularly preferably 5 to 25, and most preferably 5 to 20. In such ranges, the product stability and the defoaming property at elevated temperatures are further improved.

The ester compound (E) can be easily obtained from the market and examples thereof include the following products:

IONET S-60C {manufactured by Sanyo Chemical Industries, Ltd., sorbitan monostearate, HLB value: 4.7; "IONET" is a registered trademark of the company, and the same applies hereinafter}, IONET S-80 (sorbitan monooleate, HLB value: 4.3), IONET S-80C (sorbitan monooleate, HLB value: 4.3), IONET DO-20 (polyoxyethylene dioleate, HLB value: 5.3), RHEODOL SP-P10 {manufactured by Kao Corporation, sorbitan monopalmitate, HLB value: 6.7; "RHEODOL" is a registered trademark of the company, and the same applies hereinafter}, RHEODOL SP-S10 (sorbitan monostearate, HLB value: 4.7), RHEODOL SP-S30 (sorbitan tristearate, HLB value: 2.1), RHEODOL SP-O10 (sorbitan monooleate, HLB value: 4.3), RHEODOL MS-5O (glycerol monostearate, HLB value: 2.8), RHEODOL MO-6O (glycerol monooleate, HLB value: 2.8), EMASOL MO-50 {manufactured by Kao Corporation, glycerol monooleate, HLB value: 2.8; "EMASOL" is a registered trademark of the company, and the same applies hereinafter}, MONOGLY D {manufactured by NOF Corporation, fatty acid monoester of glycerol, HLB value: 3.8}, MONOGLY MB (glycerol monostearate, HLB value: 5.5), NONION PP-40R pellet {manufactured by NOF Corporation, sorbitan monopalmitate, HLB value: 6.7}, NONION BP-70R (sorbitan monobehenate, HLB value: 3.9), and the like.

IONET 5-20 (manufactured by Sanyo Chemical Industries, Ltd., sorbitan monolaurate, HLB value: 8.6), IONET S-85 (sorbitan trioleate, HLB value: 1.8), IONET MO-400 (polyoxyethylenemonooleate, HLB value: 11.8), RHEODOL SP-L10 (manufactured by Kao Corporation, sorbitan monolaurate, HLB value: 8.6), EMASOL L-10 (F) (manufactured by Kao Corporation, sorbitan monolaurate, HLB value: 8.6), RHEODOL TW-L120 (polyoxyethylene sorbitan monolaurate, HLB value: 16.7), NONION L-2 (manufactured by NOF Corporation, polyoxyethylene monolaurate, HLB value: 9.9), NONION CP-08R (sorbitan monocaprylate, HLB value: 9.6), UNIGLY MK-207 {manufactured by NOF Corporation, polyoxyethylene coconut oil fatty acid glyceryl, HLB value: 13.0; "UNIGLY" is a registered trademark of the company, and the same applies hereinafter}, UNIGLY GO-102R (polyglycerol oleate, HLB value: 8.8), and the like.

In the hydrophobic liquid (Q) is contained a hydrophobic substance in addition to the ester compound (E).

Any substance that does not dissolve easily in water and can be mixed with the ester compound (E) uniformly and is liquid (at 25° C.) can be used as such a hydrophobic substance without limitations, and examples thereof include hydrocarbon oils (A1), organopolysiloxanes (A2), polyether compounds (A3), fatty acid metal salts (B1), fatty acid amides (B2), and hydrophobic wet silica (B3) prepared by hydrophobizing silica having a volume average particle diameter of 1 to 15 μm.

The hydrophobic liquid (Q) preferably contains an ester compound (E), at least one member selected from the group consisting of a hydrocarbon oil (A1), an organopolysiloxane (A2), and a polyether compound (A3), and at least one member selected from the group consisting of a fatty acid metal salt (B1), a fatty acid amide (B2), and hydrophobic wet silica (B3) prepared by hydrophobizing silica prepared using a wet process and having a volume average particle diameter of 1 to 15 μm.

Examples of the hydrocarbon oil (A) include mineral oils and synthetic lubricating oils.

Examples of the mineral oils include mineral oils having a kinematic viscosity at 40° C. of 5 to 40 $mm^2/s$ and examples thereof include spindle oils, machine oils, and refrigerating machine oils. Examples of the trade names of mineral oils (the numbers in parentheses are a pour point (° C.)) include COSMO PURESPIN G (−10), COSMO PURESPIN E(0), COSMO SP-10 (−12.5), COSMO SP-32 (−40), and COSMO SC22 (−15) (all manufactured by COSMO OIL Co., Ltd.; "COSMO" and "PURESPIN" are registered trademarks of the company), and STANOL 35 (−15) and STANOL 43N (−15) (both manufactured by Exxon Mobil Corporation).

Examples of the synthetic lubricating oils include polyolefin oils (α-olefin oils), polybutene oils, alkylbenzene oils (alkylate oils), and isoparaffin oils.

Examples of the isoparaffin oils include isoparaffin oils having a kinematic viscosity at 25° C. of 1 to 20 $mm^2/s$, and exemplary trade names thereof include LINEALENE {manufactured by Idemitsu Kosan Co., Ltd.; "LINEALENE" is a registered trademark of the company}, DIALEN {manufactured by Mitsubishi Chemical Corporation, "DIALEN" is a registered trademark of the company}, and NAS-5H {manufactured by NOF Corporation}.

Of these, mineral oils are preferred.

The hydrocarbon oils (A1) preferably have a pour point of −50 to 2° C.

The pour point is measured in accordance with JIS K2269-1987 (3. Pour Point Test Method).

Examples of the organopolysiloxane (A2) include polymers having a siloxane linkage as a main chain and having an alkyl group, an aryl group, an alkoxyl group, a polyoxyalkylene group, or the like as a side chain, and examples thereof include polyalkylsiloxanes {dimethylpolysiloxane, methylethylpolysiloxane, diethylpolysiloxane, hydrogenmethylpolysiloxane, methylphenylpolysiloxane, and dimethylsiloxane-alkoxy (having 4 to 12 carbon atoms) methylsiloxane copolymers}, and modified silicones each resulting from the addition of a polyoxyethylene and/or polyoxypropylene chain or the like to a side chain or a terminal of a polyalkylsiloxane.

The organopolysiloxane (A2) preferably has a kinematic viscosity at 25° C. of 50 to 100,000 $mm^2/s$.

The kinematic viscosity at 25° C. is measured in accordance with JIS K2283:2000 (corresponding International Standard: ISO2909:1981 and ISO3104:1994; the disclosure of which is herein incorporated by reference in entirety).

Examples of the polyether compound (A3) include monoalcohols having an alkyl group having 2 to 6 carbon atoms, and compounds each prepared by adding an alkylene oxide having 2 to 4 carbon atoms to a polyhydric alcohol having 2 to 6 carbon atoms or the like.

Examples of the monoalcohols having an alkyl group having 2 to 6 carbon atoms include ethyl alcohol, n-propyl alcohol, n-butyl alcohol, n-pentyl alcohol, and n-hexyl alcohol. Of these, n-butyl alcohol and n-hexyl alcohol are preferred, and n-butyl alcohol is more preferred.

Examples of the polyhydric alcohol having 2 to 6 carbon atoms include ethylene glycol, propylene glycol, diethylene glycol, dipropylene glycol, tetramethylene glycol, hexamethylene glycol, glycerol, diglycerol, trimethylolpropane, cyclohexylene glycol, pentaerythritol, sorbitan, and sorbitol. Of these, diethylene glycol, dipropylene glycol, and trimethylolpropane are preferred.

Examples of the alkylene oxide having 2 to 4 carbon atoms include ethylene oxide, propylene oxide, and butylene oxide. When a plurality of alkylene oxides are used in the chemical reaction of the above-mentioned alcohol with the alkylene oxide, the order of reacting them (a block fashion, a random fashion, and a combination thereof) and the usage percentages are not particularly limited, but preferably, a block fashion or a combination of a block fashion and a random fashion is included. Such a chemical reaction may be carried out in any fashion, such as anionic polymerization, cationic polymerization, or coordinated anionic polymerization. These fashions of polymerization may be used singly or in combination depending upon the degree of polymerization or the like.

The polyether compound (A3) preferably has a number average molecular weight of 500 to 5,000.

Examples of the fatty acid metal salt (B1) include compounds represented by general formula (2):

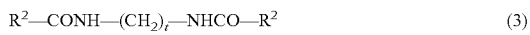

wherein $R^1$ denotes an alkyl group having 1 to 21 carbon atoms or an alkenyl group having 2 to 21 carbon atoms, M denotes a mono- to tri-valent metal atom, and q denotes an integer of 1 to 3.

The alkyl group having 1 to 21 carbon atoms or the alkenyl group having 2 to 21 carbon atoms ($R^1$) is the same as that represented by the general formula (1). Of these, in view of the defoaming property and the like, alkyl groups (linear alkyl groups and linear alkenyl groups) are preferred, linear alkyl groups are more preferred, linear alkyl groups having 8 to 20 carbon atoms are particularly preferred, and dodecyl and octadecyl are most preferred.

Examples of the mono- to tri-valent metal atom (M) include atoms of alkali metals (lithium, sodium, potassium, and the like), alkaline earth metals (barium, calcium, magnesium, and the like), transition metals (zinc, nickel, iron, copper, manganese, cobalt, silver, gold, platinum, palladium, titanium, zirconium, cadmium, and the like), metals of Group 13 of the periodic table (aluminum, and the like), metals of Group 14 of the periodic table (tin, lead, and the like), or lanthanoid metals (lanthanum, cerium, and the like). Of these, in terms of the defoaming property and the like, di- to tri-valent metal atoms are preferred, a zinc atom, a magnesium atom, and an aluminum atom are more preferred, and an aluminum atom is particularly preferred.

q denotes an integer of 1 to 3, but as described in the following, it does not necessarily correspond to the valence of the metal atom. That is, the fatty acid metal salt (B1) either may be composed of one metal atom and one residue formed by the removal of a hydrogen atom from a fatty acid or may be composed of one metal atom and a plurality of (preferably 2 to 3) residues of a fatty acid.

The compound represented by the general formula (2) may be either a single compound having one q or a mixture of a plurality of compounds differing in q. It also may be a mixture differing in the type of the alkyl group or the alkenyl group.

The fatty acid metal salt (B1) either may be composed of one type of metal atom and a plurality of types of fatty acids or may be composed of a plurality of types of metal atoms and one type of fatty acid. The fatty acid metal salt encompasses both a salt and a complex.

Preferred examples of the fatty acid metal salt (B1) include zinc laurate, zinc behenate, calcium stearate, zinc stearate, aluminum stearate, and magnesium stearate.

Such preferred fatty acid metal salts (B1) can be easily obtained from the market and exemplary commercial products are as follows.

Calcium Stearate, AULABRITE CA-65, POWDER BASE L, Zinc Behenate, Aluminum Stearate 300, Aluminum Stearate 600, Aluminum Stearate 900, and Barium Stearate {all manufactured by NOF Corporation}.

Examples of the fatty acid amide (B2) include compounds represented by general formula (3).

$R^2$ denotes an alkyl group having 9 to 21 carbon atoms or an alkenyl group having 10 to 21 carbon atoms; and t denotes an integer of 1 to 3.

Examples of the alkyl group having 9 to 21 carbon atoms or the alkenyl group having 10 to 21 carbon atoms ($R^2$) include examples of the alkyl group having 1 to 21 carbon atoms or the alkenyl group having 2 to 21 carbon atoms of the general formula (1), the examples being equivalent to $R^2$ in the number of carbon atoms.

Examples of the fatty acid amide (B2) include ethylene bis-setoreilamide, ethylene bis-stearylamide, ethylene bis-palmitylamide, ethylene bis-myristylamide, ethylene bis-laurylamide, ethylene bis-oleylamide, ethylene bis-octylamide, propylene bis-stearylamide, propylene bis-palmitylamide, propylene bis-myristylamide, propylene bis-laurylamide, propylene bis-oleylamide, butylene bis-stearylamide, butylene bis-palmitylamide, butylene bis-myristylamide, butylene bis-laurylamide, and butylene bis-oleylamide.

Any silica prepared by hydrophobizing silica prepared using a wet process and having a volume average particle diameter of 1 to 15 μm can be used as the hydrophobic wet silica (B3) without any limitations.

Examples of the silica prepared using a wet process and having a volume average particle diameter of 1 to 15 μm include silica prepared using a wet process in the amorphous synthetic silica (SN). That is, examples of the amorphous synthetic silica (SN) include dry (pyrogenic, fused) silica (SD) and wet (gel-processed, precipitated) silica (SW) as described above. Of these, silica prepared using a wet process and having a volume average particle diameter of 1 to 15 μm may be used as wet silica.

Examples of the hydrophobic wet silica (B3) include hydrophobic silica prepared by hydrophobizing wet silica (SW) with an oleophilic compound and having a volume average particle diameter of 1 to 15 μm (distinguished from the hydrophobic dry silica described previously).

For the hydrophobization of the wet silica (SW) with the oleophilic compound may be applied a publicly known method or the like, and examples thereof include a wet processing method of hydrophobizing wet silica (SW) by making an oleophilic compound to be adsorbed by or react to a silica particle surface in a solvent {organic solvent (e.g., toluene, xylene, biphenyl, or dimethyl sulfoxide), and a paraffin oil, a mineral oil, or the like having a kinematic viscosity of 5 to 30 mm$^2$/s (40° C.)}.

In the method for making an oleophilic compound to be adsorbed by or react to the surface of the wet silica (SW) by a wet processing method, there can be used, for example, (1) physical adsorption to pores possessed by the wet silica (SW) and (2) electric adsorption of surface charges of the wet silica (SW) with ionic functional groups of the oleophilic compound. Of these, a method using (1) physical adsorption is preferred in terms of the defoaming property and the like.

As the oleophilic compound, silicone oil, modified silicone oil, or the like can be used.

Examples of the silicone oil include dimethylsiloxane and cyclotetradimethylsiloxane each having a kinematic viscosity of 10 to 3000 (mm$^2$/s, at 25° C.).

Examples of the modified silicone include the above-mentioned dimethylsiloxane, some of the methyl groups of which have been replaced by an alkyl group having 2 to 6 carbon atoms, an alkoxyl group having 2 to 4 carbon atoms, a phenyl group, a hydrogen atom, a halogen (chlorine, bromine, or the like) atom and/or an aminoalkyl group having 2 to 6 carbon atoms.

The amount of the oleophilic compound to be used (% by weight) is preferably 5 to 70, more preferably 7 to 50, and particularly preferably 10 to 30 based on the weight of the wet silica (SW). In such ranges, the defoaming property is further improved.

In the case of using an oleophilic compound, heating treatment may be conducted. In the case of conducting the heating treatment, the heating temperature (° C.) is preferably 100 to 400, more preferably 120 to 300, and particularly preferably 140 to 250.

The volume average particle diameter (μm) of the hydrophobic wet silica (B3) is preferably 1 to 15, more preferably 1.5 to 14, and particularly preferably 2 to 13. In such ranges, the defoaming property is further improved. Usually, no change in volume average particle diameter is found between before and after the hydrophobization.

The volume average particle diameter of hydrophobic wet silica is determined as a 50% cumulative volume average particle diameter using 1.329 as the refractive index of methanol and the literature values ("A GUIDE FOR ENTERING MICROTRAC "RUN INFORMATION" (F3) DATA", produced by Leeds & Northrup) as the refractive index of a sample to be measured, by adding a sample to be measured to 1000 parts by weight of methanol {purity 99% by weight or more, manufactured by Wako Pure Chemical Industries, Ltd.} having an electric conductivity at 25° C. of 0.1 mS/m or less so as to adjust the sample concentration to 0.1% by weight to prepare a dispersion liquid to be measured, and performing the measurement at 25±5° C. by using a laser diffraction type particle size analyzer {e.g., Microtrac Model No. MT3300EX, manufactured by Leeds & Northrup} in accordance with JIS Z8825-1:2001 (corresponding international standard: 15013320-1: 1999 Particle size analysis—Laser diffraction methods—Part 1: General principles; the disclosure of the document is incorporated herein by reference).

The hydrophobic wet silica (B3) can be easily obtained from the market and examples thereof include the following products.

<Silica Prepared by Hydrophobizing Precipitated Silica>

Nipsil SS series (SS-10, SS-40, SS-50, SS-115, and the like) {manufactured by Tosoh Silica Corporation; "Nipsil" is a registered trademark of Tosoh Silica Corporation}, Sipernat D and C series (D10, D17, C600, C630, and the like) {manufactured by Degussa Japan Co., Ltd.}, SYLOPHOBIC series (100, 702, 505, 603, and the like) {manufactured by Fuji Silysia Chemical Ltd.; "SYLOPHOBIC" is a registered trademark of Fuji Silysia Chemical Ltd.}, and the like.

The hydrophobic liquid (Q) is allowed to contain a wax.

Examples of the wax include vegetable waxes (carnauba wax, rice wax, and the like), animal waxes (beeswax, and the like), mineral waxes (montan wax, and the like), and synthetic waxes (polyethylene, polypropylene, oxidized polyethylene, oxidized polypropylene, ethylene-propylene copolymers, ethylene-butene copolymers, ethylene-α-olefin copolymers, ethylene-vinyl acetate copolymers, ethylene-acrylic acid copolymers, ethylene-propylene-maleic anhydride copolymers, and the like).

When the hydrophobic liquid (Q) contains a hydrocarbon oil (A1), the content thereof (% by weight) is preferably 20 to 95, more preferably 25 to 95, particularly preferably 30 to 90, and most preferably 30 to 80 based on the weight of the hydrophobic liquid (Q). In such ranges, the defoaming property is further improved.

When the hydrophobic liquid (Q) contains an organopolysiloxane (A2), the content thereof (% by weight) is preferably 5 to 95, more preferably 5 to 90, particularly preferably 10 to 85, and most preferably 10 to 80 based on the weight of the hydrophobic liquid (Q). In such ranges, the defoaming property is further improved.

When the hydrophobic liquid (Q) contains a polyether compound (A3), the content thereof (% by weight) is preferably 5 to 95, more preferably 5 to 90, particularly preferably 10 to 85, and most preferably 10 to 80 based on the weight of the hydrophobic liquid (Q). In such ranges, the defoaming property is further improved.

When the hydrophobic liquid (Q) contains a fatty acid metal salt (B1), the content thereof (% by weight) is preferably 0.5 to 6, more preferably 0.8 to 6, particularly preferably 1 to 6, and most preferably 1 to 5 based on the weight of the hydrophobic liquid (Q). In such ranges, the defoaming property is further improved.

When the hydrophobic liquid (Q) contains a fatty acid amide (B2), the content thereof (% by weight) is preferably 0.5 to 6, more preferably 0.8 to 6, particularly preferably 1 to 6, and most preferably 1 to 5 based on the weight of the hydrophobic liquid (Q). In such ranges, the defoaming property is further improved.

When the hydrophobic liquid (Q) contains hydrophobic wet silica (B3), the content thereof (% by weight) is preferably 0.5 to 5, more preferably 0.5 to 4, particularly preferably 1 to 4, and most preferably 1 to 3 based on the weight of the hydrophobic liquid (Q). In such ranges, the defoaming property is further improved.

When the hydrophobic liquid (Q) contains a wax, the content thereof (% by weight) is preferably 0.5 to 10, more preferably 0.5 to 8, particularly preferably 1 to 7, and most preferably 1 to 5 based on the weight of the hydrophobic liquid (Q). In such ranges, the defoaming property is further improved.

As the water, there can be used tap water, industrial water, distilled water, ion-exchanged water, ground water, or the like. Of these, tap water, industrial water, distilled water, and ion-exchanged water are preferred.

The defoaming agent of the present invention may contain a surfactant and the like in addition to the hydrophobic dry silica (S) having a primary particle diameter of 5 to 100 nm, the water, and the hydrophobic liquid (Q).

As the surfactant, a publicly known nonionic, cationic, anionic, or amphoteric surfactant can be used.

Examples of the nonionic surfactants include alkylene oxide adducts of higher alkylamines, alkylene oxide adducts of higher fatty acid amides, alkylene oxide adducts of acetylene glycol, polyoxyalkylene-modified silicone (polyether-modified silicone), and polyglycerol fatty acid esters. However, nonionic surfactants do not include the polyether compounds (A3) previously described.

Examples of the cationic surfactants include higher alkylamine salts, alkylene oxide adducts of higher alkylamines, Soromin A-type cationic surfactants, Sapamin A-type cationic surfactants, Ahcovel A-type cationic surfactants, imidazoline type cationic surfactants, higher alkyl trimethylammonium salts, higher alkyl dimethylbenzylammonium salts, Sapamin type quaternary ammonium salts, and pyridinium salts.

Examples of the anionic surfactants include fatty acid alkali metal salts, fatty acid ammonium salts, fatty acid amine salts, α-olefin sulfonates, alkylbenzenesulfonic acids and salts thereof, alkyl sulfate ester salts, alkyl ether sulfate ester salts, N-acylalkyltaurine salts, and alkyl sulfosuccinates. However, anionic surfactants do not include the fatty acid metal salts (B1) previously described.

Examples of the amphoteric surfactants include salts of higher alkyl aminopropionic acids and higher alkyl dimethylbetaines.

The content (% by weight) of the hydrophobic dry silica (S) having a primary particle diameter of 5 to 100 nm based on the weight of the defoaming agent (the defoaming agent of the present invention containing the hydrophobic dry silica (S) having a primary particle diameter of 5 to 100 nm, the water, the hydrophobic liquid (Q) and, as required, a surfactant; the same applies hereafter) is preferably 0.02 to 2, more preferably 0.05 to 1.8, particularly preferably 0.07 to 1.5, and most preferably 0.1 to 1. In such ranges, the defoaming property and the product stability are further improved.

The content (% by weight) of the water based on the weight of the defoaming agent is preferably 8 to 70, more preferably 14 to 69, particularly preferably 19 to 64, and most preferably 24 to 64. In such ranges, the defoaming property is further improved.

The content (% by weight) of the hydrophobic liquid (Q) based on the weight of the defoaming agent is preferably 28 to 90, more preferably 30 to 85, particularly preferably 35 to 80, and most preferably 35 to 75. In such ranges, the defoaming property is further improved.

When a surfactant is contained, the content (% by weight) thereof based on the weight of the defoaming agent is preferably 0.3 to 4, more preferably 0.6 to 3, particularly preferably 0.9 to 2, and most preferably 1 to 2. In such ranges, the product stability may be further improved.

The viscosity (mPa·s/25° C.) of the defoaming agent of the present invention is preferably 300 to 3000, more preferably 300 to 2500, particularly preferably 500 to 2500, and most preferably 500 to 2000. In such ranges, the product stability and the defoaming property are further improved.

The viscosity is measured in accordance with JIS K7233-1986, 4.2 Single Cylinder Rotational Viscometer Method (corresponding International Standards: ISO2555 Resins in the liquid state or as emulsions or dispersions—Determination of Brookfield RV viscosity, ISO3104 Petroleum products—Transparent and opawue liquids—Determination of kinematic viscosity and calculation of dynamic viscosity, ISO3105 Glass capillary kinematic viscometer—Specification and operating instructions; the disclosure of these documents is incorporated herein by reference).

The defoaming agent of the present invention can be produced by a publicly known method or the like and, for example, the following methods can be applied.

<Production Method 1>
A method involving step (1) of adding hydrophobic dry silica (S) to a mixed liquid of a hydrophobic liquid (Q) and water and then mixing them.

<Production Method 2>
A method involving step (2) of adding hydrophobic dry silica (S) to a mixed liquid of a hydrophobic liquid (Q) and a part of water and then mixing them and further adding the remaining water thereto and then mixing them.

<Production Method 3>
A method involving step (3) of adding water to a mixed liquid of a hydrophobic liquid (Q) and hydrophobic dry silica (S) and then mixing them.

In Production Methods (1) to (3), the temperature for the addition and mixing is about 10 to about 70° C. When adding hydrophobic dry silica (s) or water and then mixing the resultant, these may be added quickly, or may be added slowly and continuously, or may be added in portions (for example, from 2 to 10 portions).

In Production Methods (1) to (3), the addition and mixing (emulsification) may be conducted by using a homogenizer, a Disper Mill, or the like.

In the event that a surfactant is contained in the defoaming agent of the present invention, the surfactant may be added and mixed in any stage.

Although the hydrophobic liquid (Q) should just include a mixing step (4) to merely mix an ester compound (E) with a hydrophobic substance other than the ester compound (E) uniformly, it may also include a heating and mixing step (5) to heat and mix them uniformly.

The mixing step (4) may be conducted either before or after Production Methods (1) to (3) {the steps (1) to (3)}. When the hydrophobic liquid (Q) contains a fatty acid metal salt (B1) and/or a fatty acid amide (B2) (including the case of containing a wax), the heating and mixing step (5) is preferably included. Although the heating and mixing step (5) may be conducted either before or after Production Methods 1 to 3 {the steps (1) to (3)}, it is preferably conducted before them.

In the heating and mixing step (5), the heating temperature (° C.) is preferably 80 to 200, more preferably 90 to 190, particularly preferably 100 to 180, and most preferably 110 to 170.

In the event that the hydrophobic liquid (Q) contains the fatty acid amide (B2) and includes the heating and mixing step (5), it preferably includes a cooling step (6) to cool under stirring after dissolving (or melting) the fatty acid amide (B2) (preferably 80° C. or lower, more preferably 60° C. or lower), and a thermal treatment step (7) to conduct thermal treatment under stirring at 60 to 80° C. (preferably for about 3 hours) following the cooling step (6).

When the hydrophobic liquid (Q) does not contain the fatty acid amide (B2), it preferably includes neither the cooling step (6) nor the thermal treatment step (7).

Following the above-described steps, the hydrophobic liquid (Q) is prepared via a cooling step (8) of conducting cooling to 40° C. or lower to obtain the hydrophobic liquid (Q).

The cooling step (6), the thermal treatment step (7), and the cooling step (8) each may be conducted either before or after Production Methods 1 to 3 {steps (1) to (3)} as long as they are conducted after the heating and mixing step (5), but they are preferably conducted before them.

When the hydrophobic liquid (Q) contains the hydrocarbon oil (A1) and the fatty acid amide (B2), it is permissible to use part of the hydrocarbon oil (A1) in the heating and mixing step (5) and add the remaining hydrocarbon oil (A1) in the following cooling step (6), the thermal treatment step (7), and/or the cooling step (8).

It is also permissible to subject the fatty acid metal salt (B1), the fatty acid amide (B2) and/or the ester compound (E) to micronization treatment with a ball mill, a Disper Mill, a homogenizer, a Gaulin Homogenizer or the like after the steps (1) to (4), (7) and/or (8).

The defoaming agent of the present invention is effective for an aqueous foamable liquid. Accordingly, it can be used as, for example, a defoaming agent for paints (water-based paints and the like) and a defoaming agent for various production processes (a paper-making process, a fermentation process, a waste water treatment process, a monomer stripping process, a polymer polymerization process, and so on).

Of these, the defoaming agent of the present invention is suited as a defoaming agent for paints, more suited as a defoaming agent for water-based paints, and it is best-suited as a defoaming agent for emulsion paints out of water-based paints (paint for water-based building exterior decoration, paint for building interior decoration, water-based ink, paint for paper coating, and the like).

Examples of the binder contained in the emulsion paint include vinyl acetate resin, acrylic resin, styrene resin, halogenated olefin resin, urethane resin, silicone resin, and fluorine atom-containing silicone resin, and the defoaming agent of the present invention is effective for any one.

The method of adding the defoaming agent of the present invention may, in the case of applying it to a paint, be a method involving adding the defoaming agent (1) at the time of pigment dispersion and/or (2) after paint preparation. Moreover, when applying the defoaming agent to various production processes, the method may be any of the methods of adding it (1) at the same time as the feed of raw materials, (2) before heating and/or pressure reduction treatment, and/or (3) during a final finishing step or the like.

When the defoaming agent of the present invention is applied to a paint, the added amount (% by weight) thereof is preferably 0.1 to 5, more preferably 0.3 to 4, particularly preferably 0.5 to 4, and most preferably 0.5 to 3 based on the weight of the paint. When the defoaming agent of the present invention is applied to various production processes, the added amount (% by weight) thereof is preferably 0.005 to 1, more preferably 0.006 to 0.8, particularly preferably 0.008 to 0.6, and most preferably 0.01 to 0.5 based on the weight of an aqueous liquid.

EXAMPLES

The present invention will be described below in more detail by way of examples, but the present invention is not limited to them. Unless otherwise stated, part(s) and % mean part(s) by weight and % by weight, respectively.

Production Example 1

Into a stainless steel vessel were charged 5 parts of an ester compound (e1) {IONET S-80, sorbitan monooleate, HLB: 4.3, manufactured by Sanyo Chemical Industries, Ltd.}, 80 parts of a hydrocarbon oil (a11) {COSMO PURESPIN RB, manufactured by Cosmo Oil Lubricants Co., Ltd., pour point −12.5° C.; "PURESPIN" is a registered trademark of the company}, 10 parts of a polyether compound (a31) {NEWPOL LB-1715, polyoxypropylene (degree of polymerization: 40) butyl ether, manufactured by Sanyo Chemical Industries, Ltd.; "NEWPOL" is a registered trademark of the company}, and 5 parts of a fatty acid metal salt (b11) {ALUMINUM STEARATE 900, aluminum tristearate manufactured by NOF Corporation}. The temperature was then raised up to 150° C. under stirring with a homogenizer {HIFLEX DISPERSER HG-92G, manufactured by TAITEC Corporation, the same applies hereinafter} at 3000 rpm, and heating and stirring were continued at that temperature for additional 3 hours. The resulting mixture was then allowed to cool to 30° C. by air cooling under stirring, affording a hydrophobic liquid (q1).

Production Example 2

Into a stainless steel vessel were charged 25 parts of an ester compound (e2) {IONET DL-200, polyoxyethylene (degree of polymerization: 4) glycol dilaurate, HLB: 6.6, manufactured by Sanyo Chemical Industries, Ltd.}, 40 parts of a hydrocarbon oil (a12) {NCL22, manufactured by Taniguchi Petroleum Co., Ltd., pour point −47.5° C.}, and 5 parts of a fatty acid amide (b21) {ALFLOW H-50S, ethylene bisstearylamide, manufactured by NOF Corporation; "ALFLOW" is a registered trademark of the company}. The temperature was then raised up to 130° C. under stirring with a homogenizer at 3000 rpm, and heating and stirring were continued at that temperature for additional 1 hour. Subsequently, 30 parts of a hydrocarbon oil (a12) (NCL22) was added and stirred at 70° C. for 3 hours. The resulting mixture was then allowed to cool to 30° C. by air cooling under stirring, affording a hydrophobic liquid (q2).

Production Example 3

Into a stainless steel vessel were charged 20 parts of an ester compound (e3) {RHEODOL MS-60, glycerol monostearate, HLB: 3.5, manufactured by Kao Corporation}, 74 parts of a hydrocarbon oil (a13) {COSMO PURESPIN G, manufactured by Cosmo Oil Lubricants Co., Ltd., pour point −7.5° C.}, 5 parts of an organopolysiloxane (a21) {KF96-1,000cs, dimethylsilicone oil, manufactured by Shin-Etsu Chemical Co., Ltd., 1,000 mm$^2$/s/25° C.}, and 1 part of hydrophobic wet silica (b31) {Nipsil SS-50, manufactured by Tosoh Silica Corporation, volume average particle diameter 1 μm, M value 65; "Nipsil" is a registered trademark of the company}. The temperature was then raised up to 180° C. under stirring with a homogenizer at 3000 rpm, and heating and stirring were continued at that temperature for additional 3 hours. The resulting mixture was then allowed to cool to 30° C. by air cooling under stirring, affording a hydrophobic liquid (q3).

Production Example 4

Into a stainless steel vessel were charged 3 parts of an ester compound (e4) {RHEODOL MO-60, glycerol monooleate, HLB: 2.8, manufactured by Kao Corporation}, 94 parts of an organopolysiloxane (a22) {KF96-3,000cs, dimethylsilicone oil, manufactured by Shin-Etsu Chemical Co., Ltd., 3,000 mm$^2$/s/25° C.}, and 3 parts of hydrophobic wet silica (b32) {Sipernat D10, manufactured by Degussa Japan Co., Ltd., volume average particle diameter 5 μm, M value 72; "Sipernat" is a registered trademark of Evonik Degussa GmbH}. The temperature was then raised up to 180° C. under stirring with a homogenizer at 3000 rpm, and heating and stirring were continued at that temperature for additional 3 hours. The resulting mixture was then allowed to cool to 30° C. by air cooling under stirring, affording a hydrophobic liquid (q4).

Production Example 5

Into a stainless steel vessel were charged 2.5 parts of an ester compound (e5) {IONET S-85, sorbitan monooleate, HLB: 1.8, manufactured by Sanyo Chemical Industries, Ltd.}, 80 parts of an organopolysiloxane (a23) {KF96-5,000cs, dimethylsilicone oil, manufactured by Shin-Etsu Chemical Co., Ltd., 5,000 mm$^2$/s/25° C.}, 17 parts of a polyether compound (a32) {NEWPOL PP-950, polyoxypropylene (degree of polymerization: 16) glycol, manufactured by Sanyo Chemical Industries, Ltd.}, and 0.5 parts of hydrophobic wet silica (b32) {Sipernat D10}. The temperature was then raised up to 180° C. under stirring with a homogenizer at 3000 rpm, and heating and stirring were continued at that temperature for additional 3 hours. The resulting mixture was then allowed to cool to 30° C. by air cooling under stirring, affording a hydrophobic liquid (q5).

Production Example 6

Into a stainless steel vessel were charged 10 parts of an ester compound (e1) {IONET S-80}, 84 parts of a hydrocarbon oil (a13) {COSMO PURESPIN G}, 5 parts of a polyether compound (a33) {NEWPOL 50HB-260, polyoxypropylene (degree of polymerization: 7)-polyoxyethylene (degree of polymerization: 10) butyl ether, manufactured by Sanyo Chemical Industries, Ltd.}, and 1 part of a fatty acid metal salt (b12) {Aluminum Stearate 600, aluminum distearate, manufactured by NOF Corporation}. The temperature was then raised up to 150° C. under stirring with a homogenizer at 3000 rpm, and heating and stirring were continued at that temperature for additional 3 hours. The resulting mixture was then allowed to cool to 30° C. by air cooling under stirring, affording a hydrophobic liquid (q6).

Production Example 7

Into a stainless steel vessel were charged 14 parts of an ester compound (e1) {IONET S-80}, 70 parts of a hydrocarbon oil (a12) {NCL22}, 10 parts of a polyether compound (a33) {NEWPOL 50HB-260}, and 6 parts of a fatty acid metal salt (b11) {Aluminum Stearate 900}. The temperature was then raised up to 150° C. under stirring with a homogenizer at 3000 rpm, and heating and stirring were continued at that temperature for additional 3 hours. The resulting mixture was then allowed to cool to 30° C. by air cooling under stirring, affording a hydrophobic liquid (q7).

Production Example 8

Into a stainless steel vessel were charged 1 part of an ester compound (e3) {RHEODOL MS-60}, 88 parts of a hydrocarbon oil (a13) {COSMO PURESPIN RB}, 10 parts of an organopolysiloxane (a24) {KF96-50cs, dimethylsilicone oil, manufactured by Shin-Etsu Chemical Co., Ltd., 50 mm$^2$/s/25° C.}, 0.5 parts of a fatty acid metal salt (b11) {Aluminum Stearate 900}, and 0.5 parts of a fatty acid amide (b21) {ALFLOW H-50S}. The temperature was then raised up to 130° C. under stirring with a homogenizer at 3000 rpm, and heating and stirring were continued at that temperature for additional 1 hour. The resulting mixture was then allowed to cool to 30° C. over 5 hours by air cooling under stirring, affording a hydrophobic liquid (q8).

Production Example 9

Into a stainless steel vessel were charged 17 parts of an ester compound (e3) {RHEODOL MS-60}, 80 parts of a polyether compound (a31) {NEWPOL LB-1715}, and 3 parts of a fatty acid metal salt (b13) {AULABRITE MA-76, magnesium distearate, manufactured by NOF Corporation; "AULABRITE" is a registered trademark of the company}. The temperature was then raised up to 150° C. under stirring at 3000 rpm, and heating and stirring were continued at that temperature for additional 3 hours. The resulting mixture was then allowed to cool to 30° C. by air cooling under stirring, affording a hydrophobic liquid (q9).

Production Example 10

Into a stainless steel vessel were charged 5 parts of an ester compound (e5) {IONET S-85}, 40 parts of an organopolysiloxane (a24) {KF96-50cs}, 10 parts of an organopolysiloxane (a25) {KF96-100,000cs, dimethylsilicone oil, manufactured by Shin-Etsu Chemical Co., Ltd., 100,000 mm$^2$/s/25° C.}, and 5 parts of a fatty acid amide (b22) {ALFLOW AD-281F, ethylene bis-oleylamide, manufactured by NOF Corporation}. The temperature was then raised up to 120° C. under stirring with a homogenizer at 3000 rpm, and heating and stirring were continued at that temperature for additional 1 hour. Subsequently, 40 parts of an organopolysiloxane (a24) {KF96-50cs} was added and stirred at 65° C. for 3 hours. The resulting mixture was then allowed to cool to 30° C. by air cooling under stirring, affording a hydrophobic liquid (q10).

Production Example 11

Into a stainless steel vessel were charged 11 parts of an ester compound (e4) {RHEODOL MO-60}, 85 parts of an organopolysiloxane (a21) {KF96-1,000cs}, and 4 parts of hydrophobic wet silica (b32) {Sipernat D10}. The temperature was then raised up to 180° C. under stirring with a homogenizer at 3000 rpm, and heating and stirring were continued at that temperature for additional 3 hours. The resulting mixture was then allowed to cool to 30° C. by air cooling under stirring, affording a hydrophobic liquid (q11).

Production Example 12

Into a stainless steel vessel were charged 5.5 parts of an ester compound (e2) {IONET DL-200}, 90 parts of a polyether compound (a31) {NEWPOL LB-1715}, and 4.5 parts of hydrophobic wet silica (b31) {Nipsil SS-55}. The temperature was then raised up to 180° C. under stirring with a homogenizer at 3000 rpm, and heating and stirring were continued at that temperature for additional 3 hours. The resulting mixture was then allowed to cool to 30° C. by air cooling under stirring, affording a hydrophobic liquid (q12).

Production Example 13

Into a stainless steel vessel were charged 25 parts of an ester compound (e1) {IONET S-80}, 30 parts of a hydrocarbon oil (a12) {NCL22}, 40.5 parts of a polyether compound (a31) {NEWPOL LB-1715}, 3 parts of hydrophobic wet silica (b31) {Nipsil SS-50}, and 1.5 parts of wax {EPOLENE E-10J wax, oxidized polyethylene wax, manufactured by Eastman Chemical Japan Ltd.; "EPOLENE" is a registered trademark of Westlake longview Corporation}. The temperature was then raised up to 180° C. under stirring with a homogenizer at 3000 rpm, and heating and stirring were continued at that temperature for additional 3 hours. The resulting mixture was then allowed to cool to 30° C. by air cooling under stirring, affording a hydrophobic liquid (q13).

Example 1

In a stainless steel vessel was obtained a mixed liquid by stirring and mixing 90 parts of the hydrophobic liquid (q1) obtained in Production Example 1 with 8.2 parts of ion-exchanged water (hereinafter, referred briefly to as water), and then 1.8 parts of hydrophobic dry silica (s1) {Aerosil RY200, manufactured by Nippon Aerosil Co., Ltd., primary particle diameter: 12 nm, M value: 75} was added and mixed over 30 minutes while stirring the mixed liquid at room temperature (15 to 20° C.; the same applies hereinafter) at 3000 rpm with a homogenizer, and stirring was further continued for 30 minutes. Thus, a defoaming agent (1) of the present invention was obtained.

Example 2

In a stainless steel vessel was obtained a mixed liquid by stirring and mixing 28 parts of the hydrophobic liquid (q2) obtained in Production Example 2 with 12 parts of water and 2 parts of a surfactant (1) {NAROACTY CL-40, manufactured by Sanyo Chemical Industries, Ltd., nonionic surfactant; "NAROACTY" is a registered trademark of the company}, and then 0.02 parts of hydrophobic dry silica (s2) {Aerosil R104, manufactured by Nippon Aerosil Co., Ltd., primary particle diameter: 16 nm, M value: 40} was added and mixed over 60 minutes while stirring the mixed liquid at room temperature at 3000 rpm with a homogenizer, stirring was further continued for 30 minutes, and subsequently 57.98 parts of water was added and mixed over 60 minutes while stirring at 3000 rpm. Thus, a defoaming agent (2) of the present invention was obtained.

Example 3

In a stainless steel vessel was obtained a mixed liquid by stirring and mixing 80 parts of the hydrophobic liquid (q3)

obtained in Production Example 3 with 4 parts of water and 0.95 parts of a surfactant (2) {SY-Glyster CRS-75, manufactured by Sakamoto Yakuhin Kogyo Co., Ltd., nonionic surfactant, polyglycerol condensed-recinoleic acid ester}, and then 0.05 parts of hydrophobic dry silica (s3) {Aerosil RX200, manufactured by Nippon Aerosil Co., Ltd., primary particle diameter: 12 nm, M value: 70} was added and mixed over 30 minutes while stirring the mixed liquid at room temperature at 3000 rpm with a homogenizer, stirring was further continued for 30 minutes, and subsequently 15 parts of water was added and mixed over 30 minutes while stirring at 3000 rpm. Thus, a defoaming agent (3) of the present invention was obtained.

Example 4

In a stainless steel vessel was obtained a mixed liquid by stirring and mixing 70 parts of the hydrophobic liquid (q4) obtained in Production Example 4 with 7 parts of water, and then 0.1 parts of hydrophobic dry silica (s4) {Aerosil R972, manufactured by Nippon Aerosil Co., Ltd., primary particle diameter: 16 nm, M value: 50} was added and mixed over 30 minutes while stirring the mixed liquid at room temperature at 3000 rpm with a homogenizer, stirring was further continued for 30 minutes, and subsequently 22.9 parts of water was added and mixed over 30 minutes while stirring at 3000 rpm. Thus, a defoaming agent (4) of the present invention was obtained.

Example 5

In a stainless steel vessel was obtained a mixed liquid by stirring and mixing 60 parts of the hydrophobic liquid (q5) obtained in Production Example 5 with 12 parts of water, and then 0.2 parts of hydrophobic dry silica (s5) {Aerosil R974, manufactured by Nippon Aerosil Co., Ltd., primary particle diameter: 12 nm, M value: 45} was added and mixed over 30 minutes while stirring the mixed liquid at room temperature at 3000 rpm with a homogenizer, stirring was further continued for 30 minutes, and subsequently 27.8 parts of water was added and mixed over 30 minutes while stirring at 3000 rpm. Thus, a defoaming agent (5) of the present invention was obtained.

Example 6

In a stainless steel vessel was obtained a mixed liquid by stirring and mixing 50 parts of the hydrophobic liquid (q6) obtained in Production Example 6 with 10 parts of water, and then 0.5 parts of hydrophobic dry silica (s3) {Aerosil RX200} was added and mixed over 60 minutes while stirring the mixed liquid at room temperature at 3000 rpm with a homogenizer, stirring was further continued for 30 minutes, and subsequently 39.5 parts of water was added and mixed over 30 minutes while stirring at 3000 rpm. Thus, a defoaming agent (6) of the present invention was obtained.

Example 7

In a stainless steel vessel was obtained a mixed liquid by stirring and mixing 45 parts of the hydrophobic liquid (q7) obtained in Production Example 7 with 15 parts of water, and then 0.3 parts of hydrophobic dry silica (s1) {Aerosil RY200} was added and mixed over 30 minutes while stirring the mixed liquid at room temperature at 3000 rpm with a homogenizer, stirring was further continued for 30 minutes, and subsequently 39.7 parts of water was added and mixed over 45 minutes while stirring at 3000 rpm. Thus, a defoaming agent (7) of the present invention was obtained.

Example 8

In a stainless steel vessel was obtained a mixed liquid by stirring and mixing 40 parts of the hydrophobic liquid (q8) obtained in Production Example 8 with 10 parts of water, and then 1 part of hydrophobic dry silica (s2) {Aerosil R104} was added and mixed over 45 minutes while stirring the mixed liquid at room temperature at 3000 rpm with a homogenizer, stirring was further continued for 30 minutes, and subsequently 49 parts of water was added and mixed over 45 minutes while stirring at 3000 rpm. Thus, a defoaming agent (8) of the present invention was obtained.

Example 9

In a stainless steel vessel was obtained a mixed liquid by stirring and mixing 85 parts of the hydrophobic liquid (q9) obtained in Production Example 9 with 13.5 parts of water, and then 1.5 parts of hydrophobic dry silica (s4) {Aerosil R972} was added and mixed over 60 minutes while stirring the mixed liquid at room temperature at 3000 rpm with a homogenizer, and stirring was further continued for 30 minutes. Thus, a defoaming agent (9) of the present invention was obtained.

Example 10

In a stainless steel vessel was obtained a mixed liquid by stirring and mixing 35 parts of the hydrophobic liquid (q10) obtained in Production Example 10 with 25 parts of water and 0.93 parts of a surfactant (1) {NAROACTY CL-40}, and then 0.07 parts of hydrophobic dry silica (s1) {Aerosil RY200} was added and mixed over 15 minutes while stirring the mixed liquid at room temperature at 3000 rpm with a homogenizer, stirring was further continued for 30 minutes, and subsequently 39 parts of water was added and mixed over 45 minutes while stirring at 3000 rpm. Thus, a defoaming agent (10) of the present invention was obtained.

Example 11

In a stainless steel vessel was obtained a mixed liquid by stirring and mixing 30 parts of the hydrophobic liquid (q11) obtained in Production Example 11 with 1 part of a surfactant (1) {NAROACTYCL-70, manufactured by Sanyo Chemical Industries, Ltd., nonionic surfactant} and 2.6 parts of a surfactant (4) {SN Wet 984, manufactured by San Nopco Ltd., nonionic surfactant}, and then 0.4 parts of hydrophobic dry silica (s5) {Aerosil 8974} was added and mixed over 30 minutes while stirring the mixed liquid at room temperature at 3000 rpm with a homogenizer, stirring was further continued for 30 minutes, and subsequently 66 parts of water was added and mixed over 90 minutes while stirring at 3000 rpm. Thus, a defoaming agent (11) of the present invention was obtained.

Example 12

In a stainless steel vessel was obtained a mixed liquid by stirring and mixing 75 parts of the hydrophobic liquid (q12) obtained in Production Example 12 with 24 parts of water and 0.4 parts of a surfactant (1) {NAROACTY CL-40}, and then 0.6 parts of hydrophobic dry silica (s3) {Aerosil RX200} was added and mixed over 45 minutes while stirring the mixed liquid at room temperature at 3000 rpm with a homogenizer, stirring was further continued for 30 minutes. Thus, a defoaming agent (12) of the present invention was obtained.

Example 13

In a stainless steel vessel was obtained a mixed liquid by stirring and mixing 55 parts of the hydrophobic liquid (q13) obtained in Production Example 13 with 20 parts of water, and then 2 parts of hydrophobic dry silica (s4) {Aerosil R972} was added and mixed over 75 minutes while stirring the mixed liquid at room temperature at 3000 rpm with a homogenizer, stirring was further continued for 30 minutes, and subsequently 23 parts of water was added and mixed over 30 minutes while stirring at 3000 rpm. Thus, a defoaming agent (13) of the present invention was obtained.

Example 14

In a stainless steel vessel was obtained a mixed liquid by stirring and mixing 35 parts of the hydrophobic liquid (q9) obtained in Production Example 9 with 35 parts of the hydrophobic liquid (q13) obtained in Production Example 13 and 3 parts of a surfactant (5) {SN Wet 980, manufactured by San Nopco Ltd., nonionic surfactant}, and then 0.2 parts of hydrophobic dry silica (s5) {Aerosil R974} was added and mixed over 30 minutes while stirring the mixed liquid at room temperature at 3000 rpm with a homogenizer, stirring was further continued for 30 minutes, and subsequently 26.5 parts of water was added and mixed over 60 minutes while stirring at 3000 rpm. Thus, a defoaming agent (14) of the present invention was obtained.

Comparative Example 1

In a stainless steel vessel was obtained a mixed liquid by stirring and mixing 55 parts of the hydrophobic liquid (q5) obtained in Production Example 5 with 20 parts of water, and then 0.5 parts of hydrophobic wet silica (b32) {Sipernat D10} was added and mixed over 30 minutes while stirring the mixed liquid at room temperature at 3000 rpm with a homogenizer, stirring was further continued for 30 minutes, and subsequently 24.5 parts of water was added and mixed over 30 minutes while stirring at 3000 rpm. Thus, a comparative defoaming agent (U1) was obtained.

Comparative Example 2

In a stainless steel vessel was obtained a mixed liquid by stirring and mixing 60 parts of the hydrophobic liquid (q12) obtained in Production Example 12 with 10 parts of water, and then 0.5 parts of silica {nonhydrophobized silica, Aerosil 200CF, manufactured by Nippon Aerosil Co., Ltd., primary particle diameter: 12 nm} was added and mixed over 30 minutes while stirring the mixed liquid at room temperature at 3000 rpm with a homogenizer, stirring was further continued for 30 minutes, and subsequently 29.5 parts of water was added and mixed over 60 minutes while stirring at 3000 rpm. Thus, a comparative defoaming agent (U2) was obtained.

Comparative Example 3

In a stainless steel vessel was obtained a mixed liquid by stirring and mixing 65 parts of the hydrophobic liquid (q7) obtained in Production Example 7 with 2 parts of a surfactant (6) {NONION TA-405, manufactured by NOF Corporation, polyoxyethylene-polyoxypropylene-alkyl ether, HLB: 5}, 3 parts of a surfactant (7) {NONION OT-221, manufactured by NOF Corporation, polyoxyethylene sorbitan-monooleate, HLB: 15.7} and 2 parts of a surfactant (8) {NYMEEN S-204, manufactured by NOF Corporation, polyoxyethylene-stearylamine, HLB: 8; "NYMEEN" is a registered trademark of the company} and then heating and stirring the mixture up to 40° C., then 28 parts of water was added and mixed over 60 minutes while allowing the mixed liquid to cool down to room temperature and stirring the mixed liquid at 3000 rpm with a homogenizer, and stirring was further continued with a homogenizer at 3000 rpm for 30 minutes. Thus, a comparative defoaming agent (U3) was obtained.

Comparative Example 4

In a stainless steel vessel was obtained a mixed liquid by stirring and mixing 7 parts of an α-olefin {manufactured by Idemitsu Kosan Co., Ltd., LINEALENE 2024; "LINEALENE" is a registered trademark of the company}, 15 parts of higher alcohol {KALCOL 220-80, manufactured by Kao Corporation; "KALCOL" is a registered trademark of the company}, 10 parts of stearyl stearate {EXCEPARL SS, manufactured by Kao Corporation; "EXCEPARL" is a registered trademark of the company}, and a surfactant (9) {SOFTANOL 30, manufactured by Nippon Shokubai Co., Ltd., a product prepared by adding 3 mol of propylene oxide per mol of a linear secondary alcohol having 12 to 14 carbon atoms and then adding 5 mol of ethylene oxide thereto} and then heating and stirring the mixture up to 85° C., and then 65 parts of 90° C. hot water was added and mixed over 45 minutes under stirring at 3000 rpm with a homogenizer, followed by cooling down to room temperature while stirring at 3000 rpm. Thus, a comparative defoaming agent (U4) was obtained.

For the defoaming agents (1) to (14) obtained in Examples 1 to 14 and the defoaming agents (U1) to (U4) obtained in Comparative Examples 1 to 5, the evaluations of defoaming property {defoaming property evaluations 1 to 4} were conducted in the following ways, and the evaluation results are given in Tables 1, 3, 4, and 6. The viscosities immediately after the preparation of the defoaming agents obtained in examples and comparative examples and the evaluation results of product stability are given in Table 7.

<Defoaming Property Evaluation 1>

(1) Preparation of Foamable Test Liquid

A foamable test liquid was obtained by charging 2 parts of polyoxyethylene alkyl ether [NAROACTY CL140, HLB=14.7, manufactured by Sanyo Chemical Industries, Ltd.], 2 parts of polyoxyethylene lauryl ether sulfate ester sodium salt [CARRYBON (registered trademark) EN-200, manufactured by Sanyo Chemical Industries, Ltd.], and 96 parts of ion-exchanged water into a stainless steel beaker, followed by uniform stirring and mixing for 10 minutes.

(2) Method of Testing Defoaming Property

A glass cylindrical foaming tube with a capacity of about 2000 ml was charged with 750 ml of a foamable test liquid, which was then controlled to 5° C. or 70° C., and the height of the liquid surface at this time was read as the reference height. Subsequently, by the use of a circulating pump, the foamable test liquid was continued to circulate by dropping the foamable test liquid from the top of the foaming tube (at a height of 150 mm from the reference height) into the foaming tube while draining the foamable test liquid from the bottom of the foaming tube at a rate of 3,000 ml/min. When the foamable test liquid had been foamed by this circulation and the foam height had reached the position of 100 mm away from the reference height, a sample to be evaluated {in such an amount that the concentration of a defoaming agent excluding water would be 300 ppm based on the foamable test liquid} was added with a micropipette, and then the foam height (the height of the top of foams—the reference height: mm) that varied with the continuation of the circulation of the foamable test liquid was measured at times of 5 seconds, 30 seconds, 1 minute, and 5 minutes after the start of the test. Smaller foam heights mean that the defoaming property is of higher level.

TABLE 1

(Unit: mm)

|  |  | 5° C. | | | | 70° C. | | | |
|---|---|---|---|---|---|---|---|---|---|
|  |  | After 5 seconds | After 30 seconds | After 1 minute | After 5 minutes | After 5 seconds | After 30 seconds | After 1 minute | After 5 minutes |
| Example | 1 | 18 | 17 | 30 | 57 | 15 | 15 | 28 | 50 |
|  | 2 | 20 | 22 | 35 | 63 | 22 | 20 | 32 | 43 |
|  | 3 | 12 | 13 | 21 | 41 | 8 | 12 | 20 | 38 |
|  | 4 | 8 | 10 | 12 | 25 | 7 | 8 | 11 | 19 |
|  | 5 | 7 | 7 | 11 | 29 | 5 | 8 | 10 | 24 |
|  | 6 | 15 | 18 | 28 | 66 | 19 | 23 | 27 | 56 |
|  | 7 | 14 | 15 | 20 | 27 | 20 | 19 | 25 | 34 |
|  | 8 | 13 | 18 | 22 | 37 | 12 | 19 | 22 | 34 |
|  | 9 | 19 | 23 | 30 | 55 | 24 | 25 | 28 | 46 |
|  | 10 | 6 | 5 | 15 | 27 | 7 | 8 | 13 | 23 |
|  | 11 | 8 | 10 | 12 | 21 | 7 | 10 | 12 | 17 |
|  | 12 | 21 | 28 | 38 | 67 | 31 | 32 | 40 | 58 |
|  | 13 | 20 | 23 | 29 | 61 | 26 | 24 | 33 | 53 |
|  | 14 | 14 | 20 | 25 | 33 | 15 | 15 | 22 | 35 |
| Comparative | 1 | 12 | 38 | 63 | >100 | 22 | 57 | 88 | >100 |
| Example | 2 | 35 | 80 | >100 | — | 49 | 92 | >100 | — |
|  | 3 | 50 | >100 | — | — | 68 | >100 | — | — |
|  | 4 | 19 | 37 | 78 | >100 | 34 | >100 | — | — |
| No defoaming agent |  | >100 | — | — | — | >100 | — | — | — |

<Defoaming Property Evaluation 2>
(1) Preparation of Emulsion Base Paint

Grinding and letting down were performed with the raw material compositions given in Table 2 by using an Excel Auto Homogenizer (manufactured by Nihonseiki Co., Ltd., Model ED) equipped with an impeller type blade to form paints. Each of the resulting paint was diluted with water to 80 KU (25° C.) using a Stormer viscometer (JIS K5600-2-2: 1999), so that an emulsion base paint was obtained.

TABLE 2

| Step | Composition of raw material | Amount used (part(s)) | Supplier Note |
|---|---|---|---|
| Grinding | Water | 14.4 |  |
|  | SN-Dispersant 5040 | 0.5 | 1 |
|  | SN-Thickener 640 | 0.5 | 2 |
|  | Ammonia water (25%) | 0.1 |  |
|  | SUN LIGHT SL-300 | 22.2 | 3 |
|  | TIPAQUE R930 | 18.5 | 4 |
|  | ACRONAL 295DN | 30.4 | 5 |
| Letdown | NOPCOCIDE SN135 | 1.0 | 6 |
|  | TEXANOL | 3.2 | 7 |
|  | SN-Thickener 621N | 0.2 | 8 |
|  | Water | 9.0 |  |
|  | Total | 100.0 |  |

Note 1:
A dispersant manufactured by San Nopco Ltd.
Note 2:
A thickener manufactured by San Nopco Ltd.
Note 3:
Calcium carbonate manufactured by Takehara Kagaku Kogyo Co., Ltd.
Note 4:
Titanium dioxide manufactured by Ishihara Sangyo Kaisha, Ltd.
Note 5:
An acrylic emulsion manufactured by BASF A.G.; "ACRONAL" is a registered trademark of BASF Aktiengesellschaft.
Note 6:
An antiseptic manufactured by San Nopco Ltd.
Note 7:
A film conditioner manufactured by Eastman Chemical Company; "TEXANOL" is a registered trademark of YOSHIMURA OIL CHEMICAL Co., Ltd.
Note 8:
A thickener manufactured by San Nopco Ltd.

(2) Preparation of Emulsion Paint

Samples to be evaluated {in such an amount that the concentration of a defoaming agent excluding water would be 0.5% based on an emulsion base paint} were added to emulsion base paints and were stirred and mixed at 25° C., 5000 rpm for 5 minutes with an Excel Auto Homogenizer equipped with an impeller type blade, so that emulsion paints (1) to (18) were obtained. The defoaming agents of Examples 1 to 14 were used for emulsion paints (1) to (14), respectively, and the defoaming agents of Comparative Examples 1 to 4 were used for emulsion paints (15) to (18), respectively. In addition, an emulsion paint (19) was obtained for blank in the same way except that no defoaming agent was added.

(3) Evaluation of Initial Defoaming Property

Emulsion paints (1) to (19) controlled to 5° C. or 40° C. were each stirred and mixed at 4000 rpm for 3 minutes with an Excel Auto Homogenizer equipped with an impeller type blade to entrain foams, and 15 seconds later, the specific gravities of the emulsion paints (1) to (19) entraining foams were measured with a 50 ml specific gravity cup. Larger specific gravity values indicate less entraining of foams and better defoaming property.

(4) Evaluation of Durable Defoaming Property

The emulsion paints (1) to (19) in an amount of about 250 ml were put into 250 ml sample bottles and were left at rest at 40° C. for one month in a sealed state, followed by the measurement of their specific gravities in the same way as in "(3) Evaluation of initial defoaming property", and the specific gravities were considered as durable defoaming property.

TABLE 3

|  |  | 5° C. | | 40° C. | |
|---|---|---|---|---|---|
|  |  | Initial defoaming property | Durable defoaming property | Initial defoaming property | Durable defoaming property |
| Example | 1 | 1.36 | 1.35 | 1.38 | 1.37 |
|  | 2 | 1.37 | 1.37 | 1.40 | 1.38 |
|  | 3 | 1.33 | 1.35 | 1.35 | 1.35 |
|  | 4 | 1.43 | 1.40 | 1.42 | 1.40 |
|  | 5 | 1.41 | 1.39 | 1.42 | 1.40 |
|  | 6 | 1.38 | 1.36 | 1.40 | 1.38 |
|  | 7 | 1.40 | 1.41 | 1.43 | 1.42 |
|  | 8 | 1.39 | 1.37 | 1.40 | 1.38 |
|  | 9 | 1.31 | 1.30 | 1.34 | 1.31 |
|  | 10 | 1.42 | 1.38 | 1.43 | 1.37 |
|  | 11 | 1.42 | 1.36 | 1.42 | 1.37 |

TABLE 3-continued

|  |  | 5° C. | | 40° C. | |
| --- | --- | --- | --- | --- | --- |
|  |  | Initial defoaming property | Durable defoaming property | Initial defoaming property | Durable defoaming property |
|  | 12 | 1.40 | 1.37 | 1.41 | 1.39 |
|  | 13 | 1.36 | 1.37 | 1.38 | 1.37 |
|  | 14 | 1.37 | 1.33 | 1.39 | 1.34 |
| Comparative | 1 | 1.33 | 1.12 | 1.37 | 1.18 |
| Example | 2 | 1.23 | 1.10 | 1.23 | 1.12 |
|  | 3 | 1.20 | 1.18 | 1.17 | 1.10 |
|  | 4 | 1.36 | 1.30 | 1.28 | 1.21 |
| No defoaming agent |  | 1.11 | 1.09 | 1.10 | 1.07 |

<Defoaming Property Evaluation 3>

A horizontal defoaming testing machine {a circulation type testing machine configured so that newspaper-making white water contained in a top-open rectangular cuboidal container is pumped up (at 3000 ml/min) with a circulation pump from the bottom of a first end of the rectangular cuboidal container and then is dropped from a position 20 cm above the surface of the newspaper-making white water (the upper position over a second end of the rectangular cuboidal container) to foam the newspaper-making white water, and the newspaper-making white water flows 20 cm from the second end toward the first end and then is pumped up with the pump, the testing machine being capable of measuring the length of foams from the second end on the liquid surface within the rectangular cuboidal container; see Japanese Patent No. 3799393} was charged with 500 ml of newspaper-making white water sampled at a certain paper-making plant, and the temperature was then controlled to 30° C. (or 70° C.). Subsequently, in circulating the paper-making white water (3000 ml/min), when the foam length from the landing point of the paper-making white water reached 100 mm, a sample to be evaluated in such an amount that the concentration of a defoaming agent excluding water would be 5 ppm based on the paper-making white water) was added with a micropipette. After that, the defoaming property was evaluated based on the foam length in the rectangular cuboidal container (measured at 2 minutes and 5 minutes after the start of the test, expressed in mm, smaller values indicate better defoaming properties).

TABLE 4

(Unit: mm)

|  |  | 30° C. | | 70° C. | |
| --- | --- | --- | --- | --- | --- |
|  |  | After 2 minutes | After 5 minutes | After 2 minutes | After 5 minutes |
| Example | 1 | 23 | 58 | 37 | 77 |
|  | 2 | 28 | 37 | 38 | 67 |
|  | 3 | 12 | 33 | 24 | 56 |
|  | 4 | 8 | 24 | 12 | 42 |
|  | 5 | 10 | 27 | 24 | 50 |
|  | 6 | 33 | 80 | 48 | 93 |
|  | 7 | 14 | 23 | 20 | 51 |
|  | 8 | 38 | 47 | 50 | 88 |
|  | 9 | 28 | 66 | 34 | 98 |
|  | 10 | 7 | 28 | 16 | 48 |
|  | 11 | 9 | 30 | 21 | 53 |
|  | 12 | 20 | 82 | 40 | 102 |
|  | 13 | 18 | 61 | 32 | 101 |
|  | 14 | 13 | 38 | 30 | 95 |
| Comparative | 1 | 25 | 120 | 53 | >200 |
| Example | 2 | 78 | 185 | 84 | >200 |
|  | 3 | 83 | >200 | >200 | — |
|  | 4 | 52 | >200 | >200 | — |
| No defoaming agent |  | 180 | >200 | >200 | — |

<Defoaming Property Evaluation 4>

(1) Preparation of Paper Coating Paint

Paints were formed with the following raw material compositions by using an Excel Auto Homogenizer equipped with an impeller type blade, and paper coating paints for evaluation (containing samples to be evaluated) were obtained. Paper coating paints free from defoaming agents were obtained in the same manner as described above except that no samples to be evaluated was used.

TABLE 5

| Composition of raw material | Amount used (part(s)) | Supplier Note |
| --- | --- | --- |
| Heavy calcium carbonate (Carbital 90) | 10.0 | 1 |
| First grade kaolin (ULTRA WHITE 90) | 50.0 | 2 |
| Second grade kaolin (NN kaolin clay) | 20.0 | 3 |
| Light calcium carbonate (NEOLIGHT SA-200) | 20.0 | 4 |
| SN-Dispersant 5040 | 0.2 | 5 |
| SBR latex | 20.0 | 6 |
| Phosphated starch (ACE P-160) | 5.0 | 7 |
| SN Wet 50 | 2.0 | 8 |
| Sample to be evaluated (Defoaming agent) | Note) | 9 |
| Water | 121.8 |  |
| Total | 250.0 |  |

Note 1:
manufactured by IMERYS Minerals Japan K.K.
Note 2:
manufactured by Engelhard Corporation
Note 3:
manufactured by Takehara Kagaku Kogyo Co., Ltd.
Note 4:
manufactured by Takehara Kagaku Kogyo Co., Ltd.
Note 5:
A dispersant manufactured by San Nopco Ltd.
Note 6:
JSR 0629 manufactured by JSR Corporation
Note 7:
manufactured by Oji Cornstarch Co., Ltd.
Note 8:
A wetting agent manufactured by San Nopco Ltd.
Note 9:
Amount to be 1.0 part resulting from exclusion of water the from defoaming agent (2) Evaluation of Defoaming Property A paper coating paint (containing a sample for evaluation) for evaluation was blade-coated (at a temperature of 50° C.) to one side of a piece of commercially available mechanical paper (basis weight: 63 g/m$^2$) in a coating amount of 15 g/m$^2$ at a coating rate of 50 m/min, affording coated paper. Subsequently, the coated paper was subjected to super calender treatment (conditions: temperature 40° C., linear pressure 60 kg/cm, passing twice) to afford paper for evaluation. The number of foam marks present in a paper surface (area: 20 cm×20 cm) of the paper for evaluation was counted visually. The smaller the number is, the better the defoaming property is.

TABLE 6

| | | Number of foam marks |
|---|---|---|
| Example | 1 | 1 |
| | 2 | 0 |
| | 3 | 0 |
| | 4 | 0 |
| | 5 | 0 |
| | 6 | 1 |
| | 7 | 0 |
| | 8 | 0 |
| | 9 | 1 |
| | 10 | 0 |
| | 11 | 0 |
| | 12 | 1 |
| | 13 | 1 |
| | 14 | 0 |
| Comparative Example | 1 | 2 |
| | 2 | 4 |
| | 3 | 5 |
| | 4 | 11 |
| No defoaming agent | | >50 |

<Product Stability>

Each of the defoaming agents obtained in examples and comparative examples was filled into a glass container (interior dimensions: diameter 20 mm, content liquid height 70 mm), sealed, left at rest at 60° C. for one week, and then the thickness (unit: mm) of the water layer (the lower layer) separated was evaluated.

<Viscosity>

Immediately after a defoaming agent was prepared, measurement was conducted with a rotary viscometer (VISCOMETER TV-20, manufactured by TOKI SANGYO CO., LTD., rotor No. 3, 60 or 30 rpm, liquid temperature 25° C.) in accordance with JIS K7233-1986, 4.2 Single Cylinder Rotational Viscometer Method.

TABLE 7

| | | Product stability | Viscosity (mPa · s/25° C.) |
|---|---|---|---|
| Example | 1 | 0 | 1830 |
| | 2 | 0 | 860 |
| | 3 | 0 | 1220 |
| | 4 | 0 | 1030 |
| | 5 | 0 | 1290 |
| | 6 | 0 | 1070 |
| | 7 | 0 | 1420 |
| | 8 | 0 | 1080 |
| | 9 | 0 | 1660 |
| | 10 | 0 | 1150 |
| | 11 | 0 | 770 |
| | 12 | 0 | 1520 |
| | 13 | 0 | 1120 |
| | 14 | 0 | 1000 |
| Comparative Example | 1 | 14 | 3800 |
| | 2 | 27 | 4400 |
| | 3 | 18 | 730 |
| | 4 | 32 | 1250 |

The results provided above confirmed that the defoaming agents of the present invention exhibited superior defoaming properties within a wide temperature range (5 to 70° C.) and were superior in product stability as compared with the comparative defoaming agents.

INDUSTRIAL APPLICABILITY

While the defoaming agent of the present invention can be used for any application, it is effective for aqueous foamable liquids and suitable for fields such as paint industry (water-based paints, paper coating paints), chemical industry, food stuff industry, petroleum industry, civil engineering and construction industry, textile industry, paper and pulp industry, pharmaceutical industry, and drainage treatment processes.

The invention claimed is:

1. A method for producing a defoaming agent comprising, as essential components, hydrophobic dry silica (S) prepared by hydrophobizing silica prepared using a dry process and having a primary particle diameter of 5 to 100 nm, water, and a hydrophobic liquid (Q) containing 1 to 25% by weight of an ester compound (E) represented by general formula (1):

$$(R^1-COO)_p\text{-}D \qquad (1)$$

wherein $R^1$ denotes an alkyl group having 1 to 21 carbon atoms or an alkenyl group having 2 to 21 carbon atoms; D denotes a residue resulting from the removal of a hydroxyl group contributing to an ester linkage from a compound (D') containing 2 to 6 carbon atoms and 1 to 6 hydroxyl groups or a residue resulting from the removal of a hydroxyl group contributing to an ester linkage from an adduct prepared by adding an alkylene oxide having 2 to 4 carbon atoms to the compound (D'); and p denotes an integer from 1 to 3, the method comprising a step of adding the hydrophobic dry silica (S) to a mixed liquid of the hydrophobic liquid (Q) and the water and then mixing them.

2. The method according to claim 1, wherein the M value of the hydrophobic dry silica (S) having a primary particle diameter of 5 to 100 nm is 30 to 80.

3. The method according to claim 1, wherein the content of the hydrophobic dry silica (S) is 0.02 to 2% by weight, the content of the water is 8 to 70% by weight, and the content of the hydrophobic liquid (Q) is 28 to 90% by weight, each based on the weight of the defoaming agent.

4. The method according to claim 1, wherein the hydrophobic liquid (Q) comprises:

the ester compound (E) represented by general formula (1), at least one member selected from the group consisting of a hydrocarbon oil (A1), an organopolysiloxane (A2), and a polyether compound (A3), and at least one member selected from the group consisting of a fatty acid metal salt (B1), a fatty acid amide (B2), and a hydrophobic wet silica (B3) prepared by hydrophobizing silica prepared using a wet process and having a volume average particle diameter of 1 to 15 µm.

5. The method according to claim 1, wherein the hydrophobic liquid (Q) contains a hydrocarbon oil (A1) and the pour point of the hydrocarbon oil (A1) is −50 to 2° C.

6. The method according to claim 1, wherein the hydrophobic liquid (Q) contains an organopolysiloxane (A2) and the kinematic viscosity at 25° C. of the organopolysiloxane (A2) is 50 to 100,000 mm²/s.

7. The method according to claim 1, wherein the hydrophobic liquid (Q) contains a polyether compound (A3), and the polyether compound (A3) is an adduct of an alkylene oxide having 2 to 4 carbon atoms and has a number average molecular weight of 500 to 5,000.

8. The method according to claim 1, wherein the hydrophobic liquid (Q) contains a fatty acid metal salt (B1) and the fatty acid metal salt (B1) is a compound represented by general formula (2):

$$(R^1-COO)_q-M \qquad (2)$$

wherein $R^1$ denotes an alkyl group having 1 to 21 carbon atoms or an alkenyl group having 2 to 21 carbon atoms; M denotes a mono- to tri-valent metal atom; and q denotes an integer of 1 to 3.

9. The method according to claim 1, wherein the hydrophobic liquid (Q) contains a fatty acid amide (B2) and the fatty acid amide (B2) is a compound represented by general formula (3):

$$R^2-CONH-(CH_2)_t-NHCO-R^2 \qquad (3)$$

wherein $R^2$ denotes an alkyl group having 9 to 21 carbon atoms or an alkenyl group having 10 to 21 carbon atoms; and t denotes an integer of 1 to 3.

* * * * *